United States Patent Office 3,399,088
Patented Aug. 27, 1968

3,399,088
ROOM TEMPERATURE CURED
SOLID PROPELLANT
Charles M. Christian and Robert B. Kruse, Huntsville, Ala., assignors to Thiokol Chemical Corporation, Bristol, Pa., a corporation of Delaware
No Drawing. Filed Apr. 21, 1966, Ser. No. 544,080
2 Claims. (Cl. 149—19)

ABSTRACT OF THE DISCLOSURE

A room temperature cured propellant composition consisting in parts by weight of a hydroxyl terminated polybutadiene polymer, toluene diisocyanate, epoxidized novolac resin, 2-ethyl hexoic acid salt of tri(dimethyl amino methyl) phenol, butyl carbitol formal or butyl ferrocene, ammonium perchlorate and powdered aluminum.

---

This invention relates to improvements in composite solid propellants and more particularly it relates to composite solid propellants that may be cured at room temperature.

One of the valuable properties of propellant compositions is their ability to transform readily from a liquid or semi-liquid state to a tough elastomeric solid. This change is accomplished by the addition of a chemically active reagent known as a curing agent, activator or catalyst. Some curing agents promote curing by catalytic action, others participate directly in the reaction and are absorbed into the polymeric chain. Depending upon the particular agent, curing may be accomplished at room temperature, with heat provided by exothermic reaction or by application of external heat.

It is an object of this invention, therefore, to provide a solid propellant that can be cast mixed and polymerized at room temperature.

It has been found that curing solid propellants at elevated temperatures introduces hazards, because of the oxidizer that is incorporated in the solid propellant. If the oxidizer is too sensitive or thermally unstable, shocks transferred to the solid propellant may cause premature combustion or other irreparable damage to the solid propellant.

It is another object of the invention, therefore, to provide a solid propellant that will eliminate the hazards that are associated with solid propellants that are cured at elevated temperatures.

Other problems that are solved by the use of room temperature cured solid propellants are the lowering of manufacturing costs and the reduction of residual propellant stresses that are normally associated with high temperature cured propellants, as well as extending the strain capacity of the propellant over the present high temperature cured propellants and also extending the temperature environmental storage capabilities of rocket motors.

Preparation of the room temperature cured solid propellant is accomplished by simply and thoroughly admixing the ingredients and permitting curing to take place over a predetermined period of time. The ingredients are added to a suitable mixer so that the liquids are added first, the solids are added next and the catalyst is added last. Thus at room temperature (approximately 77 degrees F.) the polymer hydroxyl terminated polybutadiene (HTPB) is added to the mixer, then the cure agent toluene diisocyanate (TDI) is added, a second polymer epoxidized novolac resin (EN) is heated sufficiently so that it will flow freely and then it is added to the mixer. Novolac resins are produced by the reaction of phenol and formaldehyde in acid solution. Such resins have the following structure:

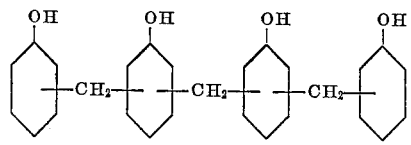

Novalac resin

Epoxy novolac resins are accomplished by the epoxylation of a novolac type base resin. The resulting resins have multi-epoxy functionality with the following structure:

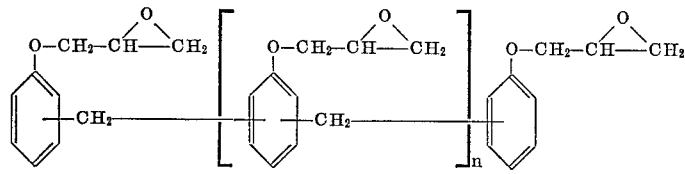

The unground oxidizer ammonium perchlorate (AP) is then added and next a plasticizer butyl carbitol formal or butyl ferrocene, then triphenylphosphite may be added as a cure accelerator and next the ground oxidizer ammonium perchlorate (AP) followed by powdered aluminum (Al), as the solids are added the ingredients are thoroughly agitated or mixed to be sure the solids have a complete wetting by the liquids. Finally the cure catalyst 2-ethylhexoic acid salt of tri(dimethyl amino methyl) phenol is added and after a thorough mixing the ingredients are cast into a motor case and permitted to stand at room temperature for the required curing time which may continue from 24 to 120 hours.

The following examples are typical of the mixes that produce a room temperature cured solid propellant as in the instant invention:

| | | | | | | | |
|---|---|---|---|---|---|---|---|
| Polymer | 14.0 | 9.8 | 11.5 | 8.1 | 10.0 | 10.3 | 10.3 |
| Cure agent | 1.5 | 1.1 | 1.1 | 0.8 | 1.0 | 0.7 | 0.7 |
| Polymer resin | 5.0 | 4.7 | 5.7 | 4.0 | 1.7 | 1.7 | 1.7 |
| Cure catalyst | 0.5 | 0.4 | 0.3 | 0.2 | 0.3 | 0.3 | 0.3 |
| Plasticizer | 3.5 | 0.0 | 4.0 | 2.9 | 3.0 | 3.0 | 3.0 |
| Oxidizer: | | | | | | | |
|   Ground | 13.0 | 13.6 | 14.3 | 17.0 | 17.0 | 17.0 | 17.0 |
|   Unground | 51.0 | 54.4 | 51.6 | 51.0 | 51.0 | 51.0 | 51.0 |
| Aluminum | 11.5 | 16.0 | 11.5 | 16.0 | 16.0 | 16.0 | 16.0 |

The cure rate for the solid propellant can be altered by the ratio of the curing catalyst that is used, as set forth in the foregoing examples, also physical and thermal properties of the solid propellant can be altered by the size of the ground and unground oxidizer.

Various modifications and alterations of this invention will become apparent to those skilled in the art without departing from the scope and spirit of this invention; and it is to be understood that the foregoing description merely represents embodiments thereof which do not unduly limit the invention.

What is claimed is:

1. A room temperature cured propellant composition consisting in parts by weight of 8.1 to 14 parts of a hydroxyl terminated polybutadiene polymer, 0.7 to 1.5 parts of toluene diisocyanate, 1.7 to 5.7 parts of an epoxidized novolac resin, 0.2 to 0.5 parts of 2-ethyl hexoic acid salt of tri (dimethyl amino methyl) phenol, 0.0 to 4 parts of butyl carbitol formal, 64.0 to 68.0 parts of ground and unground ammonium perchlorate, and 11.5 to 16 parts of powdered aluminum.

2. A propellant composition as in claim 1, wherein butyl ferrocene is substituted for butyl carbitol formal.

References Cited

UNITED STATES PATENTS

| | | | |
|---|---|---|---|
| 3,109,761 | 11/1963 | Cobb et al. | 149—19 |
| 3,249,475 | 5/1966 | Jorczak et al. | 149—19 |
| 3,257,248 | 6/1966 | Short et al. | 149—19 |

REUBEN EPSTEIN, *Primary Examiner.*